(12) United States Patent
Bauer

(10) Patent No.: US 6,854,946 B2
(45) Date of Patent: Feb. 15, 2005

(54) FLEXIBLE RETAINER CLIP

(75) Inventor: Witold Bauer, Westlake, OH (US)

(73) Assignee: Allegiance Corporation, McGaw Park, IL (US)

( * ) Notice: Subject to any disclaimer, the term of this patent is extended or adjusted under 35 U.S.C. 154(b) by 0 days.

(21) Appl. No.: 10/224,704

(22) Filed: Aug. 22, 2002

(65) Prior Publication Data

US 2004/0037669 A1 Feb. 26, 2004

(51) Int. Cl.$^7$ .............................................. F16B 21/18
(52) U.S. Cl. ...................................................... 411/523
(58) Field of Search ................................ 411/522, 523, 411/524; 403/326, 353, 354, 408.1

(56) References Cited

U.S. PATENT DOCUMENTS

| | | | | | |
|---|---|---|---|---|---|
| 2,352,392 | A | * | 6/1944 | Kost | 411/523 |
| 3,239,988 | A | * | 3/1966 | Meyer | 52/718.04 |
| 3,459,096 | A | | 8/1969 | Parkin | 85/8.8 |
| 3,869,760 | A | | 3/1975 | Meyer | 24/73 |
| 4,086,679 | A | * | 5/1978 | Butler | 16/4 |
| RE29,752 | E | * | 9/1978 | Jaconette, Jr. | 439/97 |
| 4,440,535 | A | | 4/1984 | Oehlke | 411/112 |
| 4,633,636 | A | * | 1/1987 | Alexander | 52/512 |
| 4,729,706 | A | | 3/1988 | Peterson et al. | 411/175 |
| 4,778,321 | A | | 10/1988 | Okawa | 411/523 |
| 4,883,397 | A | | 11/1989 | Dubost | 411/174 |
| 4,919,580 | A | * | 4/1990 | Wright | 411/173 |
| 4,947,524 | A | * | 8/1990 | Chang | 24/67.9 |
| 5,026,235 | A | | 6/1991 | Muller et al. | 411/523 |
| 5,039,264 | A | * | 8/1991 | Benn | 411/175 |
| 5,423,646 | A | * | 6/1995 | Gagnon | 411/184 |
| 5,713,707 | A | * | 2/1998 | Gagnon | 411/175 |
| 6,109,819 | A | | 8/2000 | Welch | 403/353 |

FOREIGN PATENT DOCUMENTS

| | | | |
|---|---|---|---|
| EP | 0 326 481 A1 | | 8/1989 |
| EP | 0 535 087 B1 | | 8/1994 |
| FR | 2 409 411 | * | 6/1979 |
| GB | 2 099 099 A | | 12/1982 |
| JP | 10099868 | | 3/1998 |

* cited by examiner

Primary Examiner—Gary S. Hartmann
(74) Attorney, Agent, or Firm—Andrew G. Rozycki

(57) ABSTRACT

The invention disclosed herein is an improved semi-rigid flexible retainer clip which is adapted for securing components, such as posts, within a sterilization container. The sterilizable, flexible retainer clip comprises a generally "U" shaped planar body having a first planar portion, second planar portion, and an integral hinge portion. Each of the planar portions have two lateral edges and a front end located opposite the hinge portion. The first planar portion and the second planar portion are biased apart from one another. The clip comprises a pair of centrally located apertures, including a first aperture on the first planar portion and a second aperture on the second planar portion. A pair of elongated narrow ridges is located on the surface of the first planar portion, each ridge being adjacent to the first aperture. The first aperture comprises a widened region and narrow region (e.g., keyhole shape). The invention also includes an instrument sterilization system including the clip. The clip is designed for manual comfort for the user despite the frequency and repetition of its use.

9 Claims, 4 Drawing Sheets

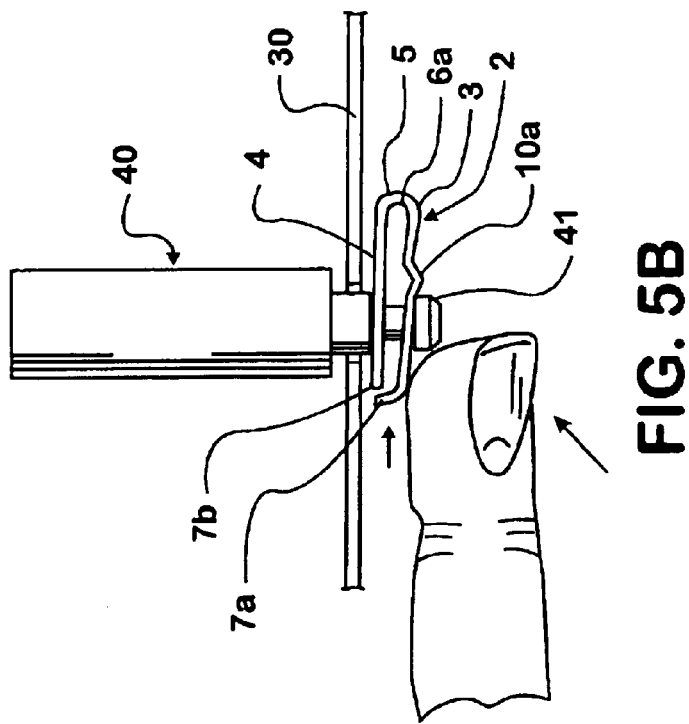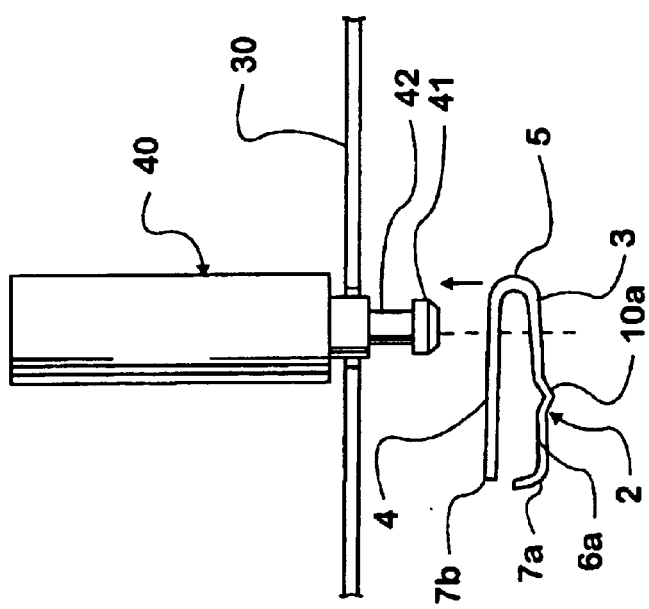

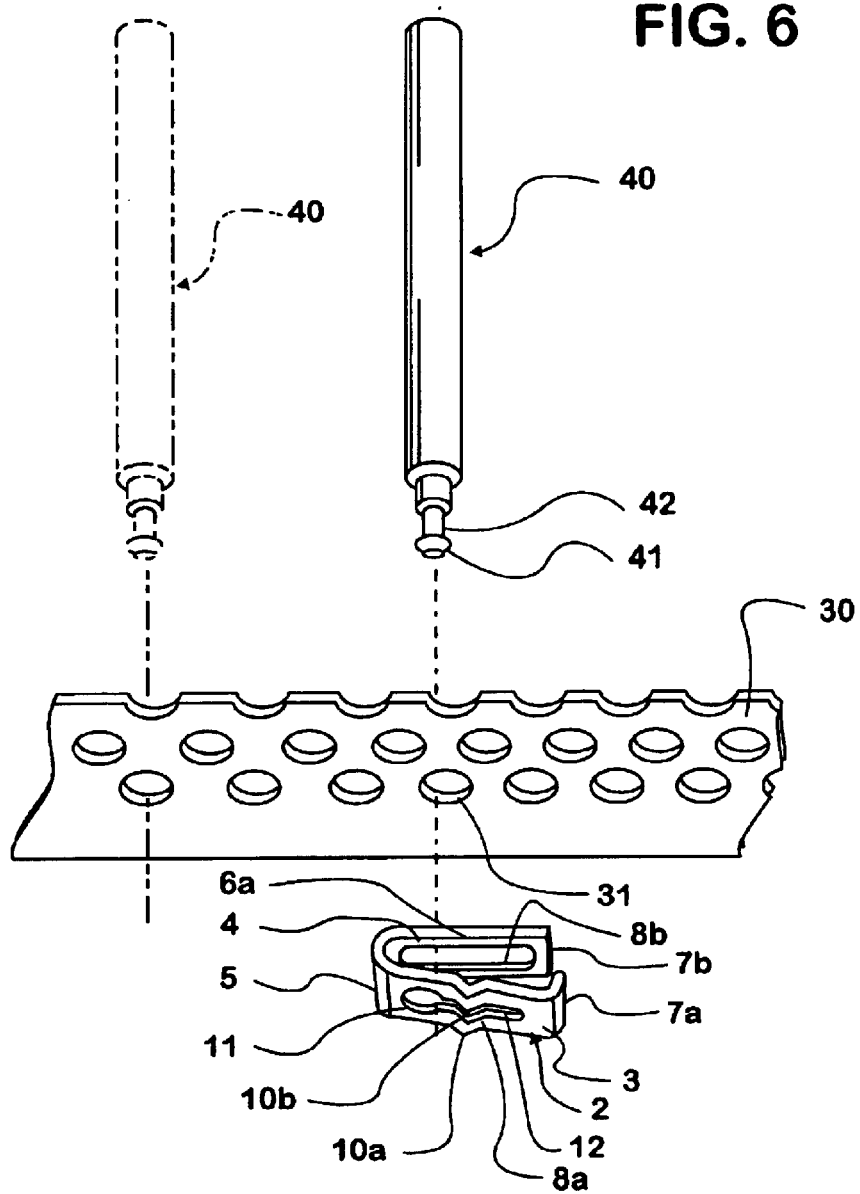

FLEXIBLE RETAINER CLIP

FIELD OF THE INVENTION

The invention relates to the field of medical devices used for sterilization of surgical instruments. In particular, the invention pertains to a flexible retainer clip useful for securing components within a sterilization container.

BACKGROUND OF THE INVENTION

A variety of clips, namely "U" shaped flexible clips, are well known in a number of fields. These "U"-shaped clips typically contain a bent planar arched structure having an aperture through which post-like structure or screw can be inserted and are biased to retain the axial positioning of the post structure. Such clips are commonly included in construction hardware equipment.

A variety of flexible clip designs and structures have been developed to improve their retention function. One such clip is described in Parkin U.S. Pat. No. 3,459,096, which discloses a spring clip for studs to be secured to an apertured support, the clip having a releasable latch. This spring clip design contains a sharp edge and requires at least two separate finger contact points and movements on the clip to fasten and release the clip once positioned over the stud.

In certain circumstances of use, relatively large numbers of relatively small flexible clips are repeatedly used. It is in such circumstances wherein the ergonomics and comfort of design, as well as reliability, become important in order to alleviate the discomfort associated with monotonous hand and finger positioning and motion.

It has been discovered that flexible clips can be useful to secure various components associated with sterilization containers in the medical field. Accordingly, it is foreseeable that within such a context of usage, medical staff would need to handle, with frequency and repetition, flexible clips. This is especially the case when flexible clips are to be used to secure posts and the like onto a sterilization screen to be positioned within a sterilization container. Thus, the ability to readily reconfigure and rearrange such components to accommodate the various instruments to be secured within the container would become important.

The current devices used for the purpose of securing components within a sterilization container are relatively cumbersome and awkward to use. Wing nuts, bolts, and the like, while frequently used to secure threaded posts within a sterilization container, for example, require repetitious, monotonous rotational hand and finger movements by the user. Furthermore, the use of secondary tools such as wrenches are sometimes needed to secure such devices in place. Given the number of conventional securing devices and the repetition of their use in assembling and arranging components and the contents of a sterilization container, manual fatigue is commonly experienced by the user. Another problem associated with conventional securing devices is the relatively time consuming process of the totality of placement, handling and securing a number of these devices when assembling the components of the sterilization container.

There exists a need in the medical field for sterilization container accessories which are easy to handle and operate. There further exists a need for devices such as flexible clips which are easy and comfortable to handle and operate, and are also reliable in their function, in securing removable attachments of components within a sterilization container.

SUMMARY OF THE INVENTION

The invention involves an improved flexible retainer clip which is adapted for repetitious usage in securing components, such as posts, within a sterilization container. The posts, in turn, secure the desired position of surgical equipment and instruments within the sterilization container. While a variety of conventional securing devices have been used for this purpose, it has been discovered that a flexible retainer clip can be structured to afford not only the functional benefit of removably and reliably attaching stems of posts to another structure, but such a clip can also be designed for manual comfort for the user despite the frequency and repetition of its use. Furthermore, no secondary tools, such as wrenches and the like, are required for attaching the clip of the invention.

The invention provides a sterilizable, flexible retainer clip for use in securing sterilization container components, said clip comprising:

a) a generally "U" shaped planar body having a first planar portion, a second planar portion, and an integral hinge portion, each of said planar portions having two lateral edges and a front end located opposite said hinge portion;

b) a pair of apertures, said first planar portion comprising a first aperture and said second planar portion comprising a second aperture, each of said apertures being centrally located on the respective planar portions; wherein said pair of apertures are aligned and sized to simultaneously accommodate a post structure inserted therethrough; and c) a pair of elongate, narrow ridges located on the upper surface of said upper planar portion, each ridge adjacent to said upper aperture;

wherein said first planar portion and said second planar portion are biased apart from one another by the said integral hinge portion;

wherein the front end of said first planar portion comprises a smooth and rounded edge;

wherein said first aperture comprises a widened region and a narrow region; and wherein said pair of ridges terminate at the junction between said widened aperture region and said narrow aperture region.

In a preferred embodiment, the front end of the first planar portion of the clip comprises an inwardly curved edge bent toward the inner surface of said second planar portion.

The flexible retainer clip of the invention is used to secure post structures to a generally planar structure and exert a retaining or tightening force therebetween. One advantage of the invention is that it contains fewer narrow edges which contact the user's fingers by its structure and requires a simple finger position to operate without extensive and frequent turning of contortional hand movements. The clip is quick and easy to attach and detach repeatedly if needed, since attachment and detachment of the clip of the invention requires application of fingertip pressure from the user exerted at an angle to lock the clip over the post structure and fasten the post structure onto another component.

Another advantage of the invention is that it provides reliable non-slippage and reduces the likelihood of migration of the post toward detachment position. The clip of the invention is also suitable for medical sterilization applications. Yet another advantage of the invention is its simplicity of design and ease of manufacture. The clip of the invention is a single piece construction. The clip of the invention does not require additional or secondary tools to attach the clip onto a post structure.

The invention also provides an instrument sterilization system for use in a sterilization container assembly, the sterilization system comprising:

a perforated sheet structure;

a post structure wherein an end portion of said post structure is adapted to extend through an opening in said perforated sheet structure;

a flexible retainer clip adapted to attach said post structure end portion, said clip comprising:

a generally "U" shaped planar body having a first planar portion, a second planar portion, and an integral hinge portion, each of said planar portions having two lateral edges and a front end located opposite said hinge portion;

a pair of apertures, said first planar portion comprising a first aperture and said second planar portion comprising a second aperture, each of said apertures being centrally located on the respective planar portions;

wherein said pair of apertures are aligned and sized to accommodate simultaneous insertion of a post structure therethrough; and a pair of elongate, narrow ridges located on the outer surface of said first planar portion, each ridge adjacent to said first aperture;

wherein said first planar portion and said second planar portion are biased apart from one another by the said integral hinge portion;

wherein the front end of said first planar portion comprises a smooth and rounded edge;

wherein said first aperture comprises a widened region and a narrow region; and wherein said pair of ridges terminate at the junction between said widened aperture region and said narrow aperture region.

BRIEF DESCRIPTION OF THE DRAWINGS

The invention is further illustrated by the following figures, none of which are intended to be construed as limitations to the invention:

FIG. 5A is a side view of a clip positioned in alignment with a post structure, a portion of which is inserted through an opening in a cutaway fragment of planar sheet structure, on which the clip is to be inserted according to one embodiment of the invention.

FIG. 5B is a side cut-away view of a clip positioned on a post structure inserted through an opening in part of a sheet structure and being secured in the locked position by a finger according to one embodiment of the invention.

FIG. 6 is an exploded view of an instrument sterilization system showing the separated components including a post structure, perforated sheet structure fragment, and flexible retainer clip, according to one embodiment of the invention.

DETAILED DESCRIPTION OF THE INVENTION

The term "flexible" as used herein is meant to refer to the property of reversibly bending a semi-rigid material using applied force of the human hand, the material returning to its original configuration upon withdrawal of said force. Within the context of the invention, the term is meant to indicate the reversible opening and closing movement of the clip.

The term "post" or "post structure" is meant to generally refer to a longitudinal structure that constitutes a portion of a larger structure and that is adapted for use with retainer clips of the invention. The larger structure that the post structure is an element of can be an instrument retention post onto which an instrument can be placed, a bracket structure, or other instrument retaining device, for example.

The flexible retainer clip of the invention is generally sized and dimensioned in accordance with its anticipated use, i.e., that which it is expected to operate in conjunction with to secure. Within the sterilization container context, the clip of the invention is adapted to secure posts onto a planar sheet or "screen" through which a portion of the post extends, and maintain the position of the post thereon throughout the sterilization and handling stages.

Figure 1:
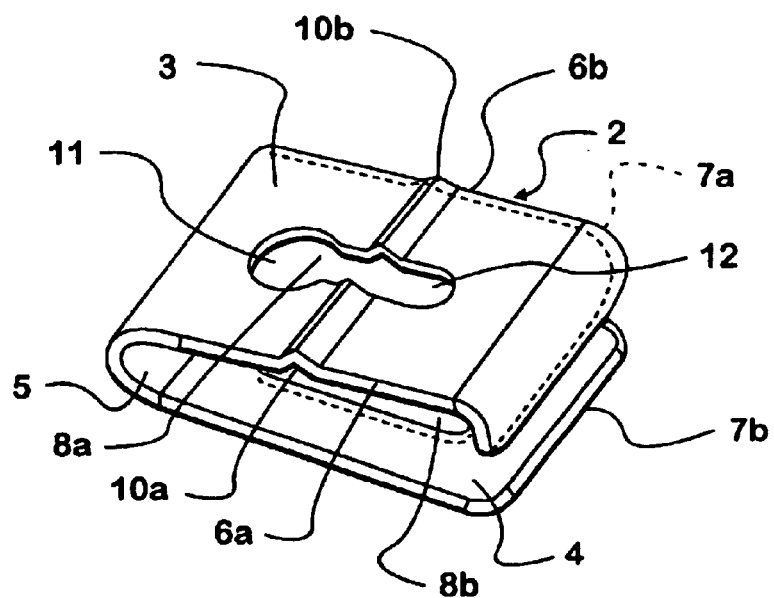
FIG. 1 is an angled side view of the retainer clip according to one embodiment of the invention.

As seen in FIG. 1, the sterilizable, flexible retainer clip of the invention comprises a generally "U" shaped planar body 2 of one-piece construction having a first planar portion 3, a second planar portion 4, and an integral hinge portion 5, each of said planar portions having two lateral edges 6a and 6b, and front ends 7a and 7b located opposite said hinge portion 5. The first planar portion 3 and second planar portion 4 are biased apart and tensioned thus by the integral hinge portion 5.

The term "U"-shaped to describe the overall configuration of the planar clip body 2 (see FIG. 2) is intended to refer to a bend between two planar portions 3 and 4 of the clip which permits operation by fingertip depression by the user. The term is not intended to impart a strict limitation to an arcuate curved structure. For example, the bend can be less arcuate and sharper resembling a configuration similar to a "V".

Figure 3:
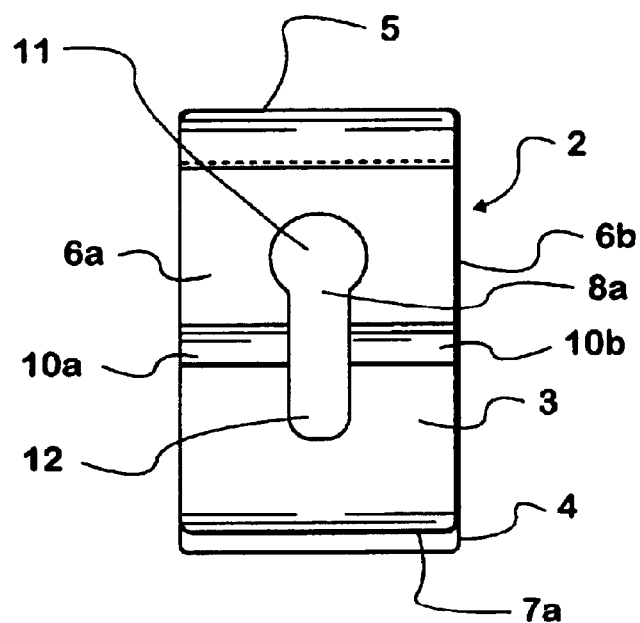
FIG. 3 is a top view of the retainer clip according to one embodiment of the invention.
Figure 4:
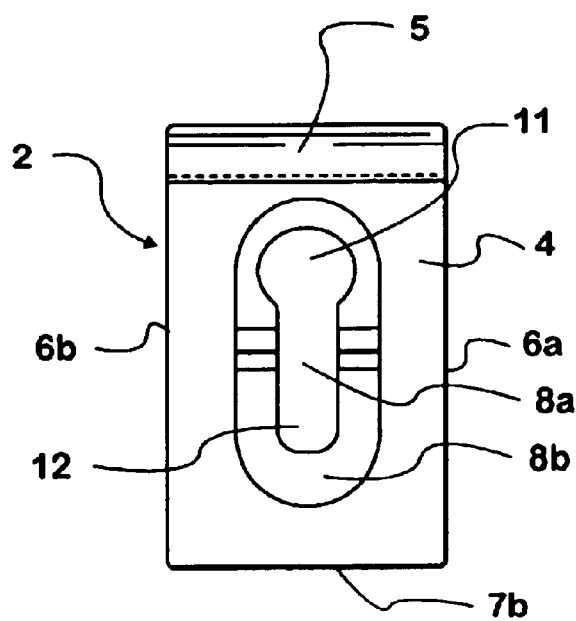
FIG. 4 is a bottom view of the retainer clip according to one embodiment of the invention.

Referring now to FIGS. 3 and 4, the clip of the invention includes a pair of apertures 8a and 8b. A first aperture 8a is located on the first planar portion 3, and a second aperture 8b is located on the second planar portion 4. Each of the apertures is centrally located on the respective planar portions. Together, the apertures are aligned and sized to simultaneously accommodate a post structure inserted therethrough as illustrated in FIGS. 5B and 6.

Referring now to FIGS. 1 and 3, the first surface of the first planar portion 3 comprises a pair of elongate, narrow ridges 10a and 10b each shown adjacent to the first aperture 8a. The ridges are depicted in the drawings as running from the side edges of the first portion and terminating at the edge of the first aperture. These ridges function to increase resistance to sliding lateral movement of the head 41 of a secured post structure 40 after the clip has been locked and the expanding tension of the bias between the first and second portions 3 and 4 respectively is applied (see FIG. 5B). A variety of ridge structures and configurations are possible, provided they form a physical obstacle in concert with expanding tension of the first and second planar portions, to resist migrational movement of the post structure inserted through the clip, while at the same time being surmountable during detachment and removal of the clip. In a preferred embodiment, the ridges comprise a curved and smooth elongated configuration to facilitate sliding over of the head of a post structure when attaching or detaching the clip.

The second aperture 8b can be dimensioned to receive an entire end portion of a post structure, whereas the first aperture 8a can be dimensioned to "selectively" receive a portion of the same post structure in accordance with the operative principles of the clip. The first aperture can have, for example, a "keyhole" shape. In other words, the first aperture 8a comprises a widened region 11 and a narrow region 12, the widened region 11 being the initial insertion site for the post structure 40, and the narrow region 12 of the aperture 8a being the retaining site for the post structure. As shown in FIGS. 5A and 5B, the post structure 40 can contain a widened head 41 which cooperates with the first and second apertures 8a and 8b respectively of the clip. Accordingly, the head 41 can only fit through the widened region 11 of the first aperture 8a, and the neck 42 of the post structure 40 can only be accommodated by the narrow region 12. The first aperture 8a is generally elongate to permit sliding motion of the clip thereby moving the neck 42 of the post structure 40 back and forth between the widened region 11 and narrow region 12. The widened region 11 and the narrow region 12 are part of a single, contiguous first aperture 8a.

Adjacent the first aperture 8a is a pair of ridges 10a and 10b located at the junction between the widened aperture region 11 and the narrow aperture region 12. The term "pair of ridges" is intended to indicate that on each side of the aperture of the first planar portion, a raised physical structure which interacts with the head 41 and neck 42 of the post structure 40 in concert with the bias of the clip, to resist undesired sliding of the clip relative to the post structure once the clip is in the locked position. The term is meant to generally refer to an interruption between ridge portions caused by an aperture, and the term is not meant to necessarily impart a structural limitation to two completely separate, non-contiguous and distinct ridges.

Figure 2:
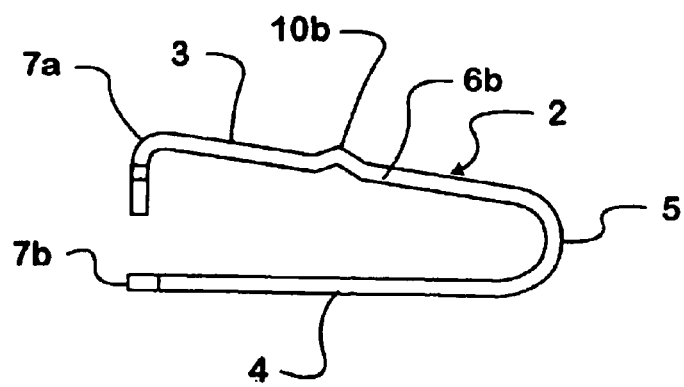
FIG. 2 is a side view of the retainer clip according to one embodiment of the invention.

In accordance with the invention and referring now to FIGS. 1 and 2, the front end 7a the first planar portion 3 comprises a smooth, rounded edge. In a preferred embodiment, the front end 7a of the first planar portion 3 comprises an inwardly curved edge bent toward the inner surface of said second planar portion 4. This feature of the clip affords considerable comfort to the user's fingertips during operation of the clip, especially when large numbers of such clips are used repetitiously. The smooth, rounded front end edge provides an edge on the clip which enhances the comfort of its use. When fingertip pressure is applied to the clip, the fingertips do not encounter a relatively sharp edge.

The flexible retainer clip of the invention can be manufactured using conventional tool and die equipment which is readily available in the manufacturing field for cutting and shaping materials. The clip of the invention is preferably of single-piece construction which is entirely composed of a single material. A variety of materials, such as plastics and metal alloys can be used, provided they are sterilizable, afford the flexible, resilient property to the clip for its operation, and provide the structural integrity required for its anticipated use. Examples of suitable materials include stainless steel.

The overall dimensions of the clip can vary in accordance with those components with which it is to be used to assemble, provided the clip can be operated using fingertip pressure and minor sliding motion to lock. The thickness of the planar clip body can also vary, provided the thickness is selected in conjunction with the physical properties of the materials used such that together they permit reversible flexing or bending of the clip.

The invention also includes an instrument sterilization system for use in a sterilization container assembly. Sterilization container assemblies are well known in the medical field and typically include a lid and base assembly, and sheet structures which fit therein upon which surgical instruments and equipment to be sterilized are placed. The instrument sterilization system components of the invention are generically represented in FIG. 6. The system comprises a perforated sheet structure 30 having a plurality of openings 31, a post structure 40 wherein an end portion of said post structure is adapted to extend through an opening 31 in the perforated sheet structure 30, and the flexible retainer clip of the invention, which is adapted to attach the post structure 40 end portion. The perforated sheet structure 30 can contain a generally planar portion as a portion of a larger overall basket configuration, the basket being dimensioned to both receive surgical instruments and reside and be enclosed within a sterilization container assembly (i.e., lid and base). FIGS. 5A, 5B and 6 show a fragment of a perforated sheet structure 30 in conjunction with a post structure 40 and the clip of the invention.

In order to function with the clip of the invention, an end portion of the post structure 40 must be adapted to cooperate with the dimensions of the clip. Accordingly, in order for a post structure 40 to be received and retained by the clip as described herein, the end portion of the post structure 40 must both fit through an opening 31 of the sheet structure 30, and contain a widened head 41 which fits through the widened region 11 of the upper planar portion aperture 8a, and a narrow neck 42 adjacent the widened head 41 which fits into the narrow region 12 of the upper planar portion aperture 8a.

FIGS. 5A and 5B collectively illustrate the attachment and securing of the flexible retainer clip of the invention. Referring to FIG. 5A, the clip is placed over the end portion of a post structure 40 which extends through an opening 31 of the sheet structure 30. The end of the post structure 40 is received by one end of the second aperture 8b and the widened region 11 of the first aperture 8a at the same time (see FIG. 6). Once positioned thusly, the user applies fingertip pressure to the front end 7a of the clip so as to force the first planar portion 3 of the clip to "close" toward the second planar portion 4 in contradiction to the integral hinge bias. When depressed such that the distance between the first and second planar portions of the clip is slightly less than the distance between the sheet structure 30 and the underside of the post structure head 41, the clip can be slid in a lateral direction so as to slide the neck 42 of the post structure 40 into the narrower region 12 of the first aperture 8a. As a result, the widened head 41 can no longer move in a transverse direction out of the clip. While depressing at a slight angle, the clip can be slid into locking position. Upon release of force by the fingertip, the post structure 40 is secured to the sheet structure 30 and the head 41 of the post structure 41 is located on the opposite side of the ridges 10a and 10b and prevented from sliding over the ridges 10a and 10b by the expansion force of the clip. Other instruments and structures likewise reliant on the post in the sterilization container likewise benefit from the fixation of the post.

An important aspect of the invention is the ease of use of the flexible retainer clip. Once the clip is placed over the end portion of a post structure, a single finger depression in concert with sliding movement, can be accomplished simultaneously by depressing the front end of the clip in an angled direction. This one-step action secures the clip into the locked position thereby securing the post structure onto an apertured sheet structure. During this locking step, the fingertip encounters the relatively comfortable smooth and rounded edge of the first planar portion of the clip. Thus, the clip of the invention affords a significant ergonomic improvement to retainer clip structure without compromising its functional purpose.

Industrial Applicability

The invention is useful as an attachment device for securing post structures within medical sterilization environments, for example. With respect to sterilization containers, the clip of the invention is used to secure post structures which in turn are relied upon to retain the intended positions of surgical instruments within the container during their sterilization and handling. The invention affords comfort for the repetitive use of the clip without the need for secondary tools, while maintaining desirable features, such as simplicity of design and non-slippage. The clip is, furthermore, easy to manufacture as it can be of single piece, single material construction.

The invention has been described herein above with reference to various and specific techniques and embodiments. It will be understood by one of ordinary skill, however, that reasonable modifications and variations of such embodiments and techniques are possible and can be made without significantly departing from either the spirit or scope of the invention as defined by the claims below.

What is claimed is:

1. A sterilizable, flexible retainer clip for use in securing sterilization container components, said clip comprising:
   a) a generally "U" shaped planar body having a first planar portion, a second planar portion, and an integral hinge portion, each of said planar portions having two lateral edges and a front end located opposite said hinge portion;
   b) a pair of apertures, said first planar portion comprising a first aperture and said second planar portion comprising a second aperture, each of said apertures being centrally located on the respective planar portions; wherein said pair of apertures are aligned and sized to simultaneously accommodate insertion of a post structure therethrough; and
   c) a pair of elongated, narrow ridges located on the upper surface of said first planar portion, each ridge adjacent to said first aperture;
   wherein said first planar portion and said second planar portion are biased apart from one another by the said integral hinge;
   wherein the front end of said first planar portion comprises a smooth, rounded edge; wherein said first aperture comprises a widened region and a narrow region; and
   wherein said pair of ridges terminate at the region between said widened aperture region and the end of said narrow aperture region, and said ridges comprise a rounded smooth surface contiguous with said first planar portion.

2. The clip according to claim 1 wherein said front end of said first planar portion comprises an inwardly curved edge bent toward the inner surface of said second planar portion.

3. The clip according to claim 1 wherein said clip is constructed from a single piece of a single material.

4. The clip according to claim 2, wherein said clip is composed of a semi-rigid flexible metal.

5. The clip according to claim 3 wherein said clip is composed of stainless steel.

6. An instrument sterilization system for use in a sterilization container assembly, said instrument sterilization system comprising:
   a perforated sheet structure;
   a post structure wherein an end portion of said post structure is adapted to extend through an aperture on said perforated sheet structure;
   a flexible retainer clip adapted to attach to said post structure end portion, said clip comprising:
   a) a generally "U" shaped planar body having an first planar portion, a second planar portion, and an integral hinge portion, each of said planar portions having two lateral edges and a front end located opposite said hinge portion;
   b) a pair of apertures, said first planar portion comprising a first aperture and said second planar portion comprising a second aperture, each of said apertures being centrally located on the respective planar portions;
   wherein said pair of apertures are aligned and sized to simultaneously accommodate a post structure inserted therethrough; and
   c) a pair of elongate, narrow ridges located on the first surface of said first planar portion, each ridge adjacent to said first aperture;
   wherein said first planar portion and said second planar portion are biased apart from one another by the said integral hinge portion;
   wherein the front end of said first planar portion comprises a smooth, rounded edge;
   wherein said first aperture comprises a widened region and a narrow region; and
   wherein said pair of ridges terminate at the region between said widened aperture region and said narrow aperture region.

7. The system according to claim 6, wherein said front end of said first planar portion of said clip comprises an inwardly curved edge bent toward the inner surface of said second planar portion.

8. The system according to claim 6, wherein said perforated sheet structure comprises a plurality of openings.

9. The system according to claim 6 comprising a plurality of post structures.

* * * * *